UNITED STATES PATENT OFFICE.

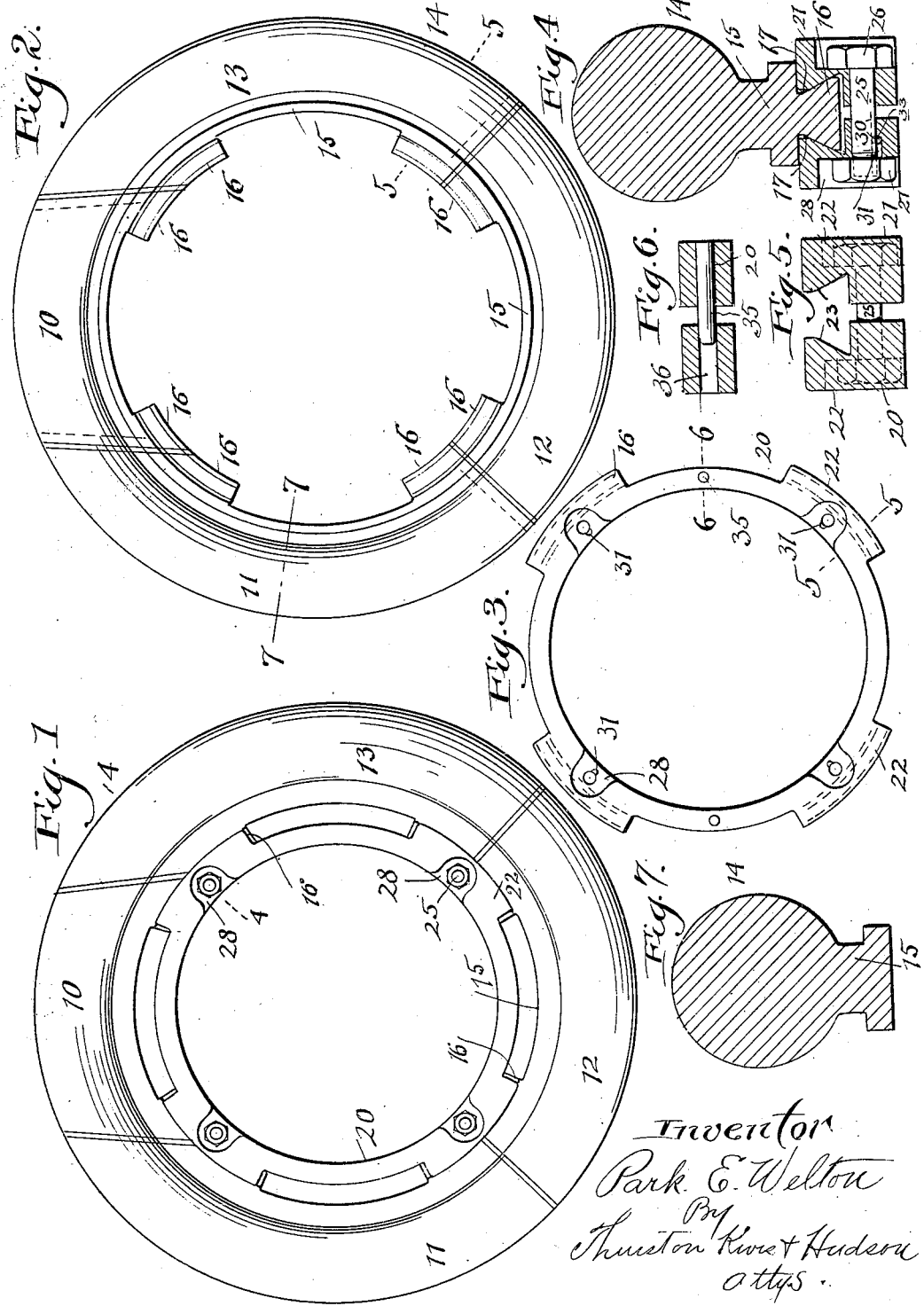

PARK E. WELTON, OF CUYAHOGA FALLS, OHIO.

COLLAPSIBLE ANNULAR CORE.

1,369,720.  Specification of Letters Patent.  Patented Feb. 22, 1921.

Application filed January 19, 1920. Serial No. 352,412.

*To all whom it may concern:*

Be it known that I, PARK E. WELTON, a citizen of the United States, residing at Cuyahoga Falls, in the county of Summit and State of Ohio, have invented a certain new and useful Improvement in Collapsible Annular Cores, of which the following is a full, clear, and exact description.

Collapsible sectional annular cores are in general use in making automobile tire casings. Each core comprises a plurality of arc-shaped sections which are of suitable cross-section configuration, and are of such length that, when placed end to end, they form a complete annulus; and their ends are so shaped that when a tire casing has been completed thereon the core can be removed from the casing by withdrawing the core sections one by one inward toward the axis of the core and between the inner edges of the tire casing.

It is necessary to employ some means for holding the core sections in their proper relation while the tire casing is being formed thereon. This invention consists of certain novel means for this purpose, said means being such that they may be easily and quickly made to engage the properly arranged core sections for the purpose of connecting them and properly alining them, and may be easily and quickly made to disengage said core sections in order that the core may be knocked down in the usual manner. Another characteristic of the invention is that the parts which constitute the means for connecting the core sections need not be disconnected from one another in order that they may be applied to or removed from the core.

The invention consists in the construction and combination of parts shown in the drawing and hereinafter described and pointed out definitely in the appended claims.

In the drawing, Figure 1 is a plan view of a knock-down core whose sections are connected by the means which constitute the present invention; Fig. 2 is a plan view of the core sections with the connecting clamping rings removed; Fig. 3 is a plan view of the clamping rings; Fig. 4 is radial section in the plane of line 4—4 on Fig. 1; Fig. 5 is a radial section in the plane of line 5—5 on Fig. 3; Fig. 6 is radial section in the plane of line 6—6 on Fig. 3, and Fig. 7 is a radial section on the line 7—7 of Fig. 2.

The annular knock-down core shown comprises four arc-shaped sections 10, 11, 12, 13, of which the section 10 is the key section. The ends of said sections are properly shaped, according to the usual practice, for engagement with one another. Each section has a body portion 14 adapted to fit within the tire, and a neck portion 15 which projects inward between the inner edges of a tire formed on the body. Each core section is provided near each end thereof with a short flange 16 which projects inward therefrom, that is, toward the axis of the annular core. All of these flange sections lie in the same plane at right angles to the axis of the completed core. These flanges have arc-shaped tapered centering grooves 17 in their opposite faces.

20, 21, represent two clamping rings. Each of these is provided with outwardly extended flanges 22, the length of said flanges being substantially equal to the combined length of two flanges 16 on adjacent ends of two core sections. The length of the flanges 22 is, however, less than the distance between flanges 16 on a core section. The diameter of the flanged part of the clamping rings is less than the internal diameter of the unflanged part of the annular core and the diameter of the flanged part of the annular core is slightly less than the external diameter of the unflanged parts of the clamping rings. The rings may be so placed that each flange thereon will overlap the two flanges on adjacent ends of two core sections. The opposed faces of the flanges 22 on the two rings are formed with beveled ribs 23 which fit the beveled grooves 17 in the outer faces of the flanges 16. When the rings are in the positions stated with their flanges overlapping the flanges on the core sections, and when the flanges 22 on the two rings are located one above the other, the drawing together of these rings will cause their flanges to clamp the flanges of the core sections and to properly aline them if they are not already properly alined.

Bolts 25 go through the rings adjacent but outside of the flanges 22, the heads 26 of the bolts and the nuts 27 lying in recesses 28 in the outer faces of the rings.

To remove these clamping rings from the core it is only necessary to unloosen the bolts, and then turn the clamping rings until their flanges no longer overlap the flanges on the core sections. Thereupon without disconnecting the two rings, the rings may be lifted up through the core; after which the core sections may be taken apart in the usual way.

The core sections may be reassembled on the bench in the usual way. The rings may then be passed down through the core. Then the upper ring may be lifted so that its flanges are in a plane above the flanges on the core section, and then the rings may be turned until the flanges thereon overlap the flanges on the core sections. After this the nuts may be tightened up and thereby the core sections will be clamped and held in the desired relative positions.

From the foregoing it is apparent that it is never necessary to disconnect the two clamping rings in order that they may be put in position for connecting the core sections or put into a position where they permit the removal of the core and the separation of the core sections; nor is it even necessary to screw the nuts off the bolts.

Among the subordinate features which, however, add to the practical qualities of the device as shown, are the following:

The bolts may be made with longitudinal grooves 30 and one of the ring sections may be formed with a groove 31 parallel with the axis of the bolt, and communicating with the hole through which the bolt passes. A ball 33 may be dropped into the recess formed partly in the bolt and partly in the ring, and this will prevent the bolt from turning so that, when tightening or loosening the nut, it will not be necessary to prevent the bolt from turning by taking hold of the head thereof.

If desired, one of the rings may be provided with one or more dowel pins 35 adapted to fit a hole 36 in the other ring. This construction will assist in bringing the two rings into the proper relative position when they are first assembled, or later if, by chance, as through the unnecessary removal of the nuts, the rings are separated.

Both rings 20, 21, as shown are alike; and it is preferable that they be alike because thereby either ring can be passed through the flanged annular core. But the construction would be operative and advantageous if only one of said rings were constructed as described, provided the other ring was of large enough diameter to overlap the flanges on the core.

Having described my invention, I claim:—

1. The combination of a sectional annular core whereof each section has an inwardly extended clamping flange portion, said portions forming a discontinuous flange ring, with a pair of clamping rings adapted to lie on opposite sides of and to engage the opposite sides of said flanges, one of said rings being of smaller external diameter than the internal diameter of the flanged part of said core, and said ring being provided with outwardly extended flanges which are adapted to overlap the flanges on the core, the length of said flanges on the rings being less than the distance between the flange portions on the core, the outside diameter of the flanged part of said ring being less than the internal diameter of the unflanged part of said core, and means to draw said rings together to clamp the interposed flange portions on the annular core.

2. The combination of a sectional annular core whereof each section has an inwardly extended clamping flange portion, said portions forming a discontinuous flange ring, with a pair of clamping rings adapted to lie on opposite sides of and to engage the opposite sides of said flanges, one of said rings being of smaller external diameter than the internal diameter of the flanged part of said core, and said ring being provided with outwardly extended flanges which are adapted to overlap the flange portion on the core, the length of said flanges on the rings being less than the distance between the flange portions on the core, the outside diameter of the flanged part of said ring being less than the internal diameter of the unflanged part of said core, a plurality of nuts, and associated bolts which go through both clamping rings to draw them toward each other and into contact with the interposed flanges on the annular core.

3. The combination of a sectional annular core whereof each section has an inwardly extended clamping flange portion, said portions forming a discontinuous flange ring, with a pair of clamping rings adapted to lie on opposite sides of and to engage the opposite sides of said flange portions, one of said rings being of smaller external diameter than the internal diameter of the flanged part of said core, and said ring being provided with outwardly extended flanges which are adapted to overlap the flange portions on the core, the length of said flanges on the rings being less than the distance between the flange portions on the core, and the outside diameter of the flanged part of said ring being less than the internal diameter of the unflanged part of said core, a plurality of nuts, and associated bolts which go through both clamping rings to draw them toward each other and into contact with the interposed flanges on the annular core,—the outer faces of said rings being formed with recesses in which the bolt heads and nuts lie.

4. The combination of a sectional annular core whereof each section has an inwardly extended clamping flange portion, said portions forming a discontinuous flange ring, with a pair of clamping rings adapted to lie on opposite sides of and to engage the opposite sides of said flanges, one of said rings being of smaller external diameter than the internal diameter of the flanged part of said core, and said ring being provided with outwardly extended flanges which are adapted to overlap the flange portions on the core, the length of said flanges on the rings being less than the distance between the flanges on the core, the outside diameter of the flanged part of said ring being less than the internal diameter of the unflanged part of said core, a plurality of nuts, and associated bolts which go through both clamping rings to draw them toward each other and into contact with the interposed flanges on the annular core, and means to prevent the rotation of the bolts on their axes in the rings.

5. The combination of a sectional annular core whereof each section is provided with two inwardly extended clamping flange portions respectively located adjacent the ends thereof, said portions forming a discontinuous flange ring with a pair of clamping rings adapted to lie on opposite sides of and engage opposite sides of said flanges, one of said rings being of smaller external diameter than the internal diameter of the flanged part of said core, and said rings being formed with outwardly extended flanges which are adapted to overlap and engage the flange portions on the core, each of said flanges being long enough to engage two adjacent flange portions on two core sections but being shorter than the distance between the two flanges on a core section, the outside diameter of the flanged part of said ring being less than the internal diameter of the unflanged part of said core, and means to draw said rings together to clamp the interposed flanges on the annular core.

6. The combination of a sectional annular core whereof each section has an inwardly extended clamping flange portion, said portions forming a discontinuous flange ring, with a pair of clamping rings adapted to lie on opposite sides of and to engage the opposite sides of said flange portions, one of said rings being of smaller external diameter than the internal diameter of the flanged part of said core, and said ring being provided with outwardly extended discontinuous flanges which are adapted to overlap the flange portions on the core, the length of said flanges on the rings being less than the distance between the flange portions on the core, the outside diameter of the flanged part of said ring being less than the internal diameter of the unflanged part of said core, the flange portions on the core and the flanges on the ring being formed with inter-engaging arc-shaped ribs and grooves having beveled engaging surfaces, and means to draw the two clamping rings toward each other.

7. The combination of a sectional annular core whereof each section has an inwardly extended clamping flange portion, said portions forming a discontinuous flange ring, with a pair of similar clamping rings whose external diameter is less than the internal diameter of the unflanged part of said core,—said rings being provided with outwardly extended registering flanges which are adapted to overlap and engage the flange portions on the core, the length of the flanges on the rings being less than the distance between the flange portions on a core section, and the outside diameter of the flanged part of said rings being less than the internal diameter of the unflanged part of said annular core, nuts, and bolts which go through both rings adjacent the flanges thereof for drawing the flanged rings toward each other and for preventing them from being turned relatively to each other.

In testimony whereof, I hereunto affix my signature.

PARK E. WELTON.